(12) United States Patent
Benaron (10) Patent No.: US 9,197,859 B2
(45) Date of Patent: Nov. 24, 2015

(54) RAPID, NO-FLOW, WHOLE-BLOOD, AND VOLUMETRIC CIRCULATING CELL COUNTING SYSTEM AND METHOD

(75) Inventor: David A Benaron, Portola Valley, CA (US)

(73) Assignee: CELLNUMERATE CORPORATION, Campbell, CA (US)

( * ) Notice: Subject to any disclaimer, the term of this patent is extended or adjusted under 35 U.S.C. 154(b) by 959 days.

(21) Appl. No.: 13/290,058

(22) Filed: Nov. 5, 2011

(65) Prior Publication Data

US 2012/0133749 A1 May 31, 2012

Related U.S. Application Data

(60) Provisional application No. 61/418,356, filed on Nov. 30, 2010.

(51) Int. Cl.
*H04N 7/18* (2006.01)
(52) U.S. Cl.
CPC ........................................ *H04N 7/18* (2013.01)
(58) Field of Classification Search
CPC ....................... G06K 9/00127; A01K 2217/05
USPC .......................... 348/61, 79; 250/584; 424/9.1
See application file for complete search history.

(56) References Cited

U.S. PATENT DOCUMENTS

| | | | |
|---|---|---|---|
| 6,217,847 B1 * | 4/2001 | Contag et al. ................... | 424/9.1 |
| 7,255,851 B2 * | 8/2007 | Contag et al. ................... | 424/9.1 |
| 7,724,937 B2 | 5/2010 | So | |
| 2005/0271548 A1 | 12/2005 | Yang | |
| 2006/0274309 A1 | 12/2006 | Cerni | |
| 2007/0117158 A1 | 5/2007 | Coumans | |
| 2009/0022768 A1 | 1/2009 | King | |
| 2009/0072171 A1 | 3/2009 | So | |
| 2009/0117532 A1 | 5/2009 | Doyle | |
| 2011/0052037 A1 | 3/2011 | Coumans | |
| 2012/0003730 A1 | 1/2012 | Padmanabhan | |
| 2012/0071335 A1 | 3/2012 | Manaresi | |
| 2012/0148140 A1 | 6/2012 | DiCarlo | |
| 2014/0212333 A1 * | 7/2014 | Peterson et al. ................ | 422/28 |

FOREIGN PATENT DOCUMENTS

WO   WO2012051390   4/2012

OTHER PUBLICATIONS

Wong, Prognostic significance of circulating tumour cells enumerated after filtration enrichment in early and metastatic breast cancer patients. Breast Cancer Research and Treatment (2006) 99: 63-69.
Lu, Isolation of circulating epithelial and tumor progenitor cells with an invasive phenotype from breast cancer patients. Int J Cancer. Feb. 1, 2010; 126(3): 669-683.
Riethdorf, Detectionof Circulating Tumor Cells in Peripheral Blood of Patients with Metastatic Breast Cancer: A Study of the CellSearch System. Clin Cancer Res 2007;13(3) Feb. 1, 2007 920-928.
Attard. Utilizing circulating tumor cells: challenges and pitfalls. Current Opinion in Genetics & Development 2011, 21:50-58.

* cited by examiner

*Primary Examiner* — Nhon Diep (57) ABSTRACT

A device (101) for determining the presence, absence, concentration, or count of rare cell or cell-like objects in a turbid fluid consisting of a light source (103) for illuminating a chamber (123) containing a solution including complexes of suspended cells or cell-like moieties (261) and an optically-active agent, and further including an imaging detector (145) and an output (147) for providing a determined or displayed result. Methods of enumeration are also disclosed.

19 Claims, 7 Drawing Sheets

RAPID, NO-FLOW, WHOLE-BLOOD, AND VOLUMETRIC CIRCULATING CELL COUNTING SYSTEM AND METHOD

CROSS REFERENCE TO RELATED APPLICATIONS

This application claims the benefit of, and priority to, U.S. Provisional Patent Application No. 61/418,356, filed Nov. 30, 2010, entitled "Rapid, No-Flow, Whole-Blood, And Volumetric Circulating Cell Counting System And Method," the entire disclosure of which is hereby fully incorporated by reference.

FIELD OF THE INVENTION

The present invention relates generally to devices and methods for performing the detection of rare cells (typically fewer than 1 in 1 million and often as few as 1 in 10 billion) in whole blood in a manner allowing detection without prior enrichment, separation, or preparation of the samples, and more particularly relates to a device for counting rare circulating tumor cells (CTCs) in which, a sufficient volume of blood containing optically-labeled CTCs is illuminated, imaged simultaneously for fluorescence markers, and the resulting image processed for estimation of the presence, absence, or numerical count, or concentration of CTCs.

BACKGROUND INFORMATION

Circulating cells can be found in the bloodstream of patients and animal research subjects in many states of health and disease.

For example, circulating tumor cells (CTCs) can be found at some time in all major cancers: ovarian, pancreatic, breast, prostate, colon, renal, and lung cancer. The presence, absence, concentration, or cell counts for CTCs can be used to identify and distinguish patients with cancer, to identify patients undergoing relapse, or to predict survival.

Circulating bacterial cells also are found during early Infection and in stem cell regeneration. In the early stages of infection, there are 1-100 CFU (colony forming units) of bacteria per cc of blood. Bacteria range in size from 0.2-2 microns in width or diameter, and up to 1-10 microns in length for the non-spherical species. Thus, the non-spherical species are comparable in size to circulating tumor cells, while spherical bacteria are smaller. Early detection of infections leads to treatment (antibiotics) prior to systemic collapse. There are 1.2 million cases of blood infection (sepsis) in the US each year, and the cost of treatment runs nearly 9 billion dollars. An early test would allow for early antibiotic selection, reducing cost, and more rapid detection and treatment, improving patient outcome However, the frequency of these rare circulating cells in the blood is typically on the order of fewer than 100 circulating tumor cells per billion blood cells, and sometimes as rare as 1 in 10 billion. The search for such cells is hard to conceptualize. Imagine trying to locate these cells in 4 billion red cells and 4-10 million white blood cells per cc or human blood. Counting the cells in one cc of blood, by hand, at one cell per second would take in excess of 100 years. This makes finding these rare cells problematic as counting a few hundred particular stars within a galaxy, when real-world issues such as signal to noise are considered.

Approaches have therefore been developed to find these "needle in a haystack" cells. Currently, these approaches in use and under development.

The gold standard known in the art since the 1970s is flow cytometry, which involves flow of cells through an illuminated chamber (Benaron 1982, Cruz 2005, U.S. Pat. No. 4,693,972). Typical flow rates and cell counts in flow cytometry are limited by image and data acquisition times, with cell detection typically down to 1 cell in 1,000 to 10,000 cells (Table 2 in Allan 2010) or, a lower limit of 400,000 to 4,000,000 per cc. This is still 100,000 to 1 million times too insensitive to count an entire milliliter of whole blood, so that for rare cells, an enrichment of the sample of the target cells is usually required-before a flow cytometry assay is performed, in order to get the count times down to, a matter of hours. Often, this enrichment requires the step of attaching targeted magnetic particles to pull out and concentrate the cells. This increase in the concentration of the cells of interest is called an enrichment step, and because this step is both time consuming and lossy, counts are adversely affected as is the time required to perform the test. A key feature of flow cytometry is that the fluid moves, or flows, and that a small volume of the test fluid is monitored at a time. Flow cytometry has even been performed in vivo (US Pub. Pat. Appn. No. 2010/0049041), made possible by flowing cells.

Another known approach is laser scanning (e.g. U.S. Pat. No. 5,547,849). In this approach, cells are placed on a slide or in, stationary capillaries, often with the staining dye present in solution. As the cells are stained in place, there is no washing step. Then, a moving laser beam scans the slide, and a simple confocal detector looking at fluctuations in the amount of light over the small illuminated volume, such as a 10 micron wide capillary tube up to 100 microns deep. Because this was not gathered as an image, noise rejection through image processing could not was not performed. This approach allowed counting of common cells, such as white blood cell T-cell subsets for monitoring of human immunodeficiency virus infections, but the volume of blood monitored made rare cell counting difficult. While this approach reduces prep time, sensitivity is similar to that of flow cytometry, with a lower limit of 400,000 cells per cc, without enrichment or enhancement steps.

A newer and emerging approach is to flow cells through a microfluidics-based microelectromechanical system (MEMS) (e.g., Nagrath 2007). This can allow for cell sorting as well as cell counting. The cells are flowing and are not stationary, and flow rates are limited by the number and diameter of the flow tubes, such that rare cell counting is harder to achieve in large volumes of fluid (e.g., 1 cc). However, such systems have been demonstrated to be able to capture 1 cell in 10,000,000 cells, equal to a lower limit of sensitivity of 400 cells per cc, substantially better than flow cytometry (Table 2 in Allan 2010). To achieve detection of 4-10 cells per cc may still requires an intervening MEMS or laboratory enrichment step.

Other emerging approaches include methods that look for signature proteins (e.g., Proteomics approaches), or lyse the cells and look for signature DNA (e.g., by PCR-based amplification and detection) (Bosolasco 2002). Such approaches are unable to directly enumerate the number of cells, as the target cell has been destroyed, or is not counted; rather, a product or a component of the cell is detected. Further, due to the level of other proteins in the mixture, the detection limit is 1 cell in 10,000 to 1,000,000 cells (or 1 cell in 4,000) (Table 2 in Allan 2010).

All of the above systems lack a method for simultaneous illumination and monitoring of a non-flowing volumetric sample of blood sufficiently large so as to provide counting statistics for rare cells, without any laboratory preparation, separation, or enrichment step.

What is needed is a non-flowing sample device that allows insertion and assay of a volumetric sample of blood sufficiently large to allow for accurate enumeration and/or detection of rare circulating cells, without any laboratory preparation, separation, or enrichment step.

SUMMARY OF THE INVENTION

We propose something totally counterintuitive and new: taking state-of-the-art optical imaging technology into 1-10 cc (or more) volumetric chambers to perform real-time rare cell counting in an intact, opaque, non-flowing volume of whole blood. In this approach, blood is first drawn into syringes and then injected into stoppered vials which have one or more of targeted stains, anti-coagulants and anti-aggregation anti-binding coatings, and next injected into a 1 cc volumetric passivized chamber to lastly perform real-time no-preparation, separation optical imaging of whole blood samples. This will allow for one-step no-prep cell counting without separation, concentration, or washing steps.

This approach has multiple inherent advantages.

A first advantage is that this volumetric non-flow non-scanning approach will permit for nearly instant (in seconds or minutes versus hours or days) bedside or benchtop, and simple cartridge-based cell counts of nearly any target cell, including circulating tumor cells, as well as bacteria, fungi, or even environmental exposures to infectious agents.

A second advantage is that the cost of the tests will be driven substantially downward. The benchtop cartridge market is already a multi-billion dollar market, and this approach could be a significant contributor to that market.

Another advantage is that easy circulating cell monitoring can lead to routine earlier diagnosis, and better treatment monitoring, all of which could have an impact on both patient care and disease outcome.

Other advantages will become apparent upon studying the following detailed and enabling disclosure of the instant invention.

BRIEF DESCRIPTION OF THE DRAWINGS

The breadth of uses and advantages of the present invention are best understood by example, and by a detailed explanation of the workings of a proposed commercial method and its associated systems, devices, or methods described herein. Additionally, some of the components have been tested under laboratory studies described herein. These and other advantages of the present invention will become apparent upon consideration of the following detailed description, taken in conjunction with the accompanying drawings, in which like reference characters refer to like parts throughout, and in which.

DEFINITIONS

For the purposes of the instant invention, the following definitions are provided:

Circulating Cell: A mammalian cell, bacterial cell, or cell-like probe, nanobot, nanoprobe, micelle, genetically-engineered luciferase, fluorescent protein, or dye-expressing reporter cell, or other agent of a size generally less than 20 microns in diameter but necessarily of a sufficiently small size that permits circulation of the cell within the target fluid, such as bloodstream, lymph, spinal fluid, or other fluid compartment within a living animal or human subject. Circulating tumor cells are called CTCs.

Discrete Moiety: An object (such as a molecule, cell, organelle, micelle, or even a combination of those moieties) that has more or less defined physical boundaries, as separate on very small scales from the background fluid or medium. Moieties may have a reporting function, such as changing its fluorescence, polarization, magnetism, light scattering, or Raman cross-section in response to conditions or entities within a living entity. Then, these conditions could be estimated, counted, detected, or measured by an external detector that detects the nanobot's signal. Further, the moiety could be constructed to perform a therapeutic function, in response to an internal or external signal or power source, once the condition has been detected or localized. In some embodiments the moiety may be a nanobot, a nanomachine, or a nanite, which is a mechanical or electromechanical device whose physical dimensions, or key functioning element dimensions (such as an engineered optical receptor) are measured in nanometers.

Volumetric: A volume that is sufficiently large to allow for reliable statistics for rare cell counting. Such statistics following a Poisson distribution, which allows determination of the likelihood of missing a true positive (e.g., CTCs above a certain count threshold). While technically any fluid has a volume, volumetric is used herein to mean volumes simultaneously measured of 0.1 to 10 cc or more. Such volumes enable rare cell counting in the absence of flow. It will be demonstrated later in this disclosure, that a cell count of 5 per chamber or above is required to distinguish that level of tumor cell from zero circulating cells in a sample of blood. Such volumes contain sufficient volumes to allow for counting of rare circulating cells at the required medical level for detection, exclusion, counting, or concentration estimates. Values under 4 cells per cc therefore require volumes above 1 cc in order for reliable stochastic counting.

Large-Surface-Area: A volume that has reasonably large length and width, and possibly a large depth, as opposed to a capillary tube that primarily has length, but minimal width and depth. This results in at least one face of the volume having significant surface area, at least 1 $cm^2$, or more reasonably at least 10 $cm^2$, 20 $cm^2$, or 100 $cm^2$ on one facial surface. In contrast, if two dimensions are small, such as for a capillary tube with significant length, but little depth or width, the surface area tends to remain relatively small. For example, a square capillary rod measuring 10 microns by 10 microns in cross section and that is 7.5 cm long has a surface area on the largest face of only 0.0075 $cm^2$. The same rod holds a minimal volume in comparison to a large-surface-area device.

Sample. The material to be imaged, in which the rare detectable moieties are more or less distributed.

Light Source. A source of illuminating photons. It may be composed of a simple light bulb, a laser, a flash lamp, an LED, a white LED, or another light source or combination of sources, or it may be a complex form including, a light emitter such as a bulb or light emitting diode, one or more filter elements, a transmission element such as an integrated optical fiber, a guidance element such as a reflective prism or internal lens, and other elements intended to enhance the optical coupling of the light from the source to the tissue or sample under study. The light may be generated using electrical input (such as with an LED), optical input (such as a fluorescent dye in a fiber responding to light), or any other source of energy, internal or external to the source. The light source may be continuously on, pulsed, or even analyzed as time-, frequency-, or spatially-resolved. The light emitter may consist of a single or multiple light emitting elements, such as a combination of different light emitting diodes to produce a spectrum of light.

Translucent or Opaque: A material that transmits and scatters light, resulting in a non-transparent (e.g., clear though possibly colored) material. Typical microscopy is done on very thin or dilute solutions which are relatively transparent. This instant invention, in contrast, is designed to operate well even with translucent or opaque fluids such as layers of whole blood.

Imaging: The collection of 2-D or 3-D information from a sample, such as from a charge-coupled device (CCD) chip, as opposed to a detection from a 1-D non-imaging detector.

Non-Flowing or No-flow: The imaging in a chamber in which the blood has been inserted (typically by flow during introduction), but in which the blood is substantially still and not flowing during measurement with regard to bulk transfer of material. Of course, Brownian motion and thermal motion may still exist, and this is not to be construed as flow for the purposes of the instant invention and this specification.

No-Prep: As used herein, a test in which the blood or fluid sample is withdrawn into a syringe and directly inserted into the sample chamber, without intervening laboratory preparation, spinning, concentration, enrichment, or purification steps. A no-prep test may, in fact, be improved through laboratory preparation steps, and still be operating in accordance with the present invention, provided such an enrichment or handling step is not required for operation of the volumetric device. A no-prep test may include some simple preparatory steps, such as filtering on insertion or withdrawal into a chamber containing a dye contrast agent.

Optical-Active Agent: A molecule or tag that provides a detectable optical signal, in this case as a means of detecting cells, such as optical labeling of a cell with a fluorescent antibody. The optical agent has a molecule or material (such as an iron ferrite bead, a dye, a quantum dot, or a light scatterer) that creates the detectable optical signal. This signal may be created or change when it interacts with a target cell (or substance in, near, or around a target site), such as an unblocking of photoquenching during proteolysis of a closely-paired but protease-site linked cyanine dye, or for a color-shifting dye in response to pH. This optical signal is detected by the optical detector, often but not always in response to an optical illumination. The detection could in practice be via non-optical means, such as a radiowave or magnetic field, or a luciferase based molecule could be used, which generates light in response to energy consumed at the cellular level.

Complexed: Bound in some manner, such as fluorescent labels attached to cells are complexed to the cells, and the combined entity is a complex.

Complex: The combined entity of an optical label and a discrete moiety such as a cell.

Nanotechnology. Materials manufactured or created to have at least one dimension (width, length, diameter, or structured feature) less than 100 nm in size. Nanomaterials may be a structured rod called a nanorod, a structured tube called a nanotube, a carbon cage or ball such as a fullerene, a powder with particle size under 100 nm called a nanopowder, a crystal with called a nanopowder. A quantum dot optical label is a nanotechnology optical label.

DETAILED DESCRIPTION OF EMBODIMENTS OF THE INVENTION

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Steps of the described processes may be reordered or combined, and other steps may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents. The publications referenced above are incorporated herein by reference in their entireties.

Example 1

Device Design and Operation

Figure 1:
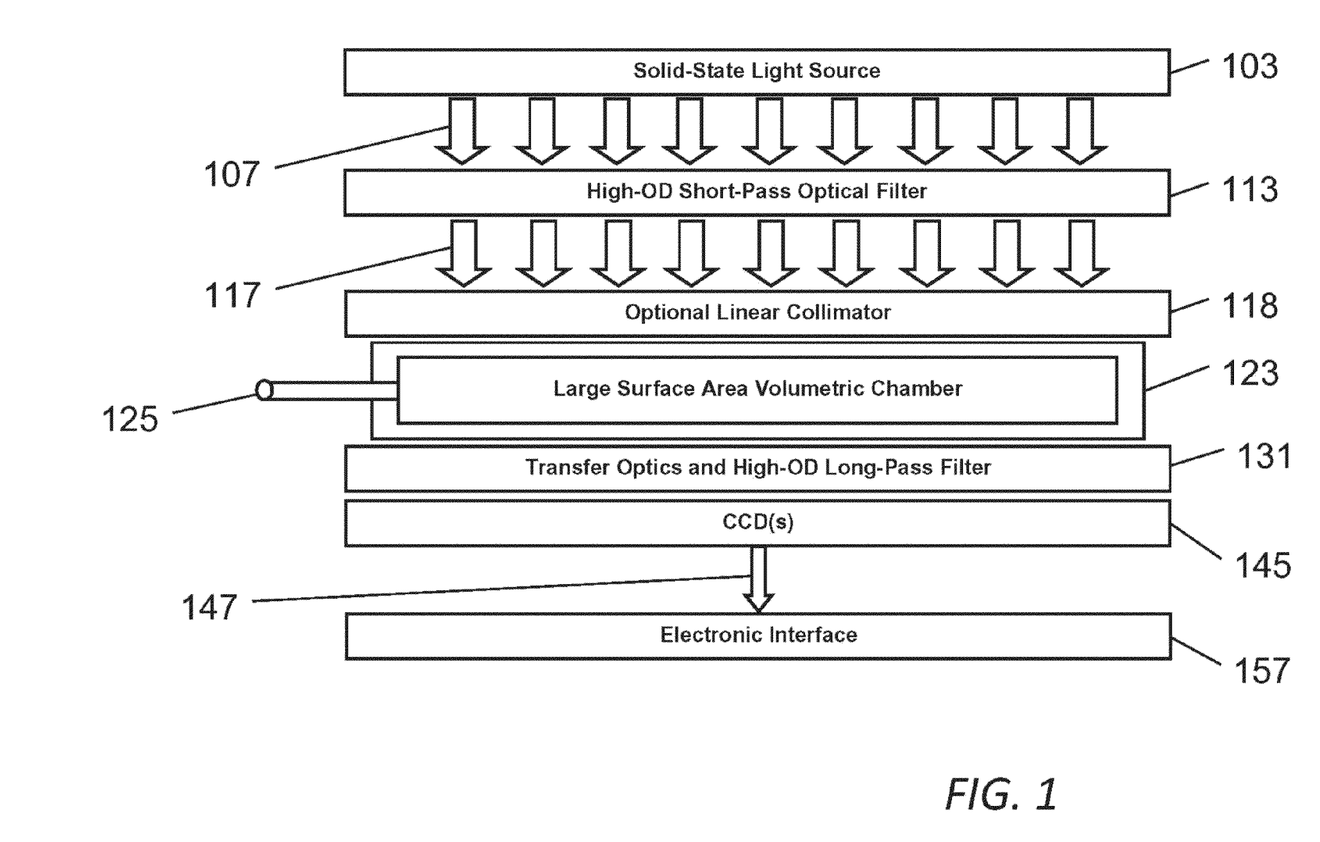
FIG. 1 shows a simplified schematic of the device.

A preferred embodiment is shown in FIG. 1. Other modifications can be envisioned by those of average skill in the art and remain within the spirit of the invention. No limitation of the scope of this invention is intended by any omission from this design. Further, while this embodiment is not intended to be the sole possible configuration of the instant invention, it nonetheless demonstrates many of its advantageous and key features.

Light source 103 can be a monochromatic, tunable, laser, or broadband light source. In this example, source 103 is made from a panel of 780 nm LEDs with an optical diffuser to create a uniform light emitted over an area 12 cm×12 cm. Because LEDs can have 20 nm bandwidths (or more), and therefore have a portion of their emission spectrum that may overlap the intended fluorescent detection bandwidth, and because the light will travel in all directions, both filter 113 and collimator 118 are added to produce a beam without light in the fluorescent detection window and which travels in a collimated fashion. Light 107 from source 103 passes through filter 113, and filtered light 117 passes into linear collimator 118. Filter 113 is a high-rejection 800 nm short pass filter (Omega. Optical, Part 3RD800SP, Brattleboro, Vt.). The collimator is a micro-fabricated angular filter (such as a narrow-angle 2-axis privacy screen). Other devices and methods for producing collimated light are known in the art, and include louvers, screens, lenses, spatial filtering, and the like. Devices and methods for producing light without a specified range of wavelengths for the purpose of imaging or fluorescence monitoring are also well known, including notch filters, narrow band light sources, beam splitters, and the like. These known alternatives all fall within the spirit of the instant invention when used for the purpose of large-volume high-surface-area volumetric rare circulating cell counting and monitoring.

Light 117 passes through collimator 118 into large-volume high-surface-area volumetric chamber 123 (or passes directly into chamber 123 if optional collimator 118 is omitted or optional filter 113 is omitted). Chamber 123 in this embodiment has an internal chamber dimensions of 7 cm by 7 cm by 0.0205 cm for a volume of 1 cc (7 cm×7 cm×0.0205 cm=1 cm cubed). The design and features of this chamber are discussed in Example 2. For now, it is sufficient to say that chamber 123 has injection port 125 for injection and introduction of blood, and that there are features which ensure a constant blood volume within the chamber. Further, within chamber 123 light interacts with the label of the blood or fluid sample, such that both light 117 passing through chamber 123, as well as newly-created fluorescent light 127 (as shown in FIG. 2) exit chamber 123 in all directions, but in particular into transfer optics 131.

Transfer optics 131 in this case is a custom fused fiber bundle (Schott Glass, customer part number) measuring 7.5 cm×7.5 cm square on the entry face next to chamber 123, and narrowing to 2.0 cm×2.0 cm for transfer to a reduced size but still large-area CCD 145. In this embodiment, this taper bundle performs several functions. First, it transfers and reduces an imaging of the bottom of the large-surface-area volumetric chamber to a smaller-area CCD. Of note, CCDs grow in expense as their area grows by an exponential factor. This reduction in size results in a cost savings at the CCD imager. Second, it provides thermal insulation from the cooled CCD detector to the sample chamber. Last, it provides capture of the least-scattered photons due to a narrow fiber capture angle, thus providing a collimating and imaging improvement function. Again, for those skilled in the art, there are multiple ways to transfer the image of the exiting light to the CCD, including lens-coupling, direct coupling, to the CCD, and other methods. Lens coupling allows for a separate long-pass optical filter to remove any transmitted illumination light 117 from the newly-created fluorescent light 127 signal. All of these alternative methods fall within the spirit of this invention if used with a large-volume high-surface-area volumetric chamber for the purpose of detecting or counting rare circulating cells.

A few comments about the CCD imaging chip. CCD 145 is one or more large-area charge coupled device (CCD) imaging chip(s). For long counting times, and best noise immunity, CCD 145 should be cooled to 0° C., or better even to −20° C., or even to −80° C., though these lower temperatures are likely not required, depending on the specifics of the design and the samples intended to be measured. Other types of imagers, including intensified CCDs, avalanche photodiode (APD) arrays, and other imaging detectors can be envisioned by one of general skill in the art. All of these alternative methods fall within the spirit of this invention if used with a large-volume volumetric chamber for the purpose of detecting or counting rare, circulating cells.

The optical signal is created by the optically-active agent. This signal may be produced by scattering, absorbance, phosphorescence, fluorescence, Raman effects, or other known spectroscopy techniques.

Last, CCD 145 produces an electronic signal, which in this example is transmitted via cable 147 to electronic interface 157, in this case a USB 3.0 electronic interface. Other methods of transmission, including wireless Bluetooth or RF coupling can be envisioned by one of general skill in the art.

This imaging device has several features of note.

First, the sample is placed in the chamber and imaged without the requirement for flow or microfluidic systems. Such systems can be added, but are not required for the operation of this large-volume volumetric cell counter system.

Second, nearly any dye or optical label can be used. The label could be a fluorescent antibody, a quantum dot labeled metabolite, a Raman spectroscopy label, or any of a number of standard optical imaging and labeling approaches known in the art.

Next, by choosing different filters or filter combinations, multiple optically-active labels or tags can be simultaneously imaged, such that only cells with a pair of labels will be tagged or counted (or, alternatively, cells with label A but not label B will be counted). Because an image is collected, and the blood or fluid is stationary, multiple labels can be tested and then the images overlapped (or co-registered by co-registration means) to allow for such multiple labeling.

Next, if the filters can be changed, then the system can work with nearly any label. A white light, source, and judicious choice of short and long pass (or notch) filters allow nearly any combination of optical labels to be used.

Next, if the CCD is replaced by a more infrared enabled camera (such as InGaAs) labels and markers well into the infrared can be utilized.

Next, if the chamber and elements are UV transmissible (such as quartz), labels and markers well into the ultraviolet can be utilized.

Operation of the device can now be described.

Figure 2A:
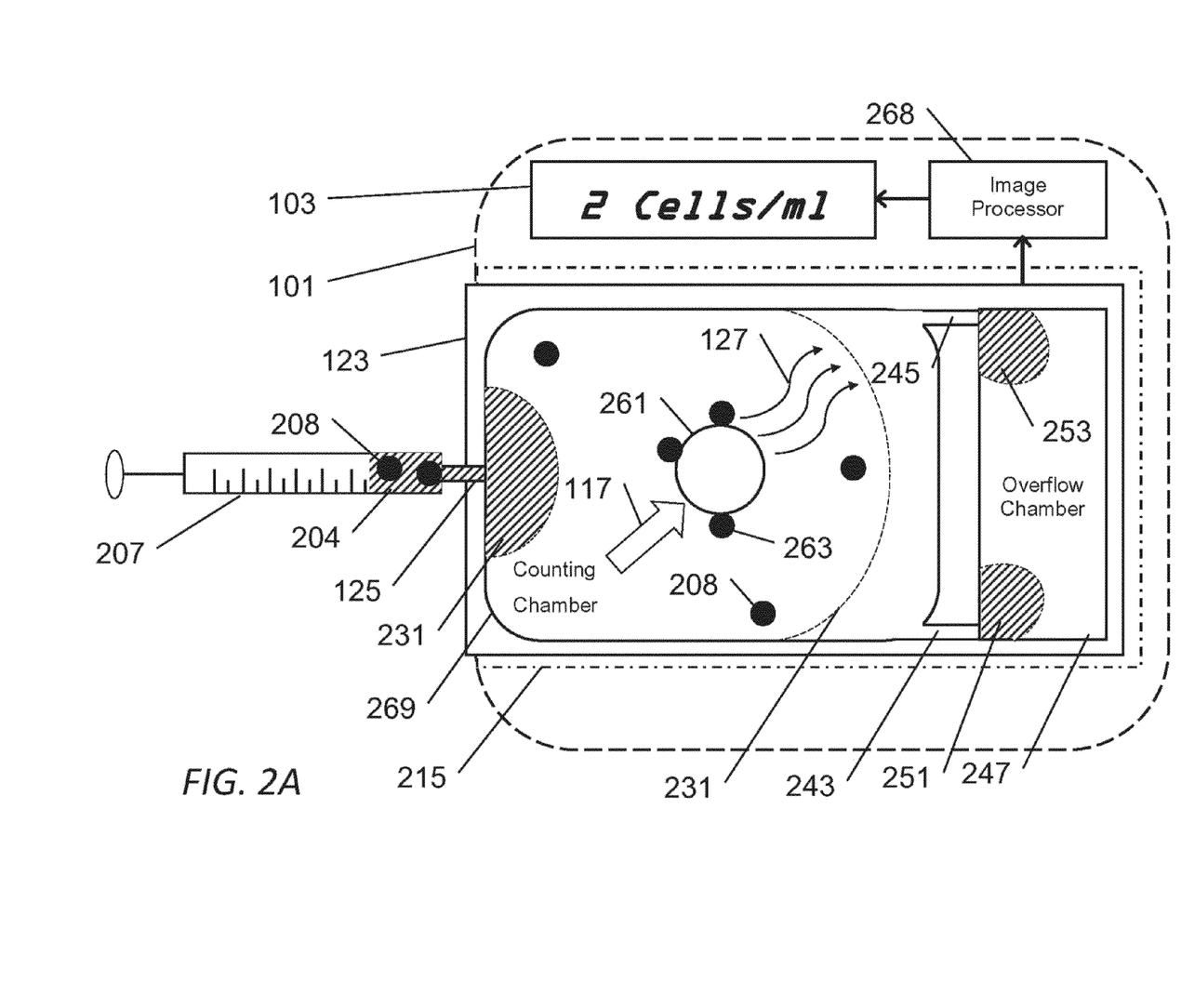
FIG. 2A shows a drawing of a syringe filling a chamber.

Referring now to FIG. 2A, after device 101 is turned on and allowed sufficient warm up time, sample 204 is drawn into syringe 207 containing free optical agent 208. The drawing mixes the sample, while inversion/righting of the syringe performs additional mixing. Chamber 123 is inserted into slot 215 (as seen in full length and width in the FIG. 2 schematic cut-away view. Sample 204 is then injected into chamber 123 via injection port 125.

As chamber 123 begins to fill with sample fluid or, blood, surface tension keeps the fluid in a controlled shape, allowing sample 204 to expand uniformly as fluid front 231, then front 235, and finally expanding through overflow ports 241 and 243 into overflow chamber 247 as fluid fronts 251 and 253 in overflow chamber. The presence of fluid in the overflow chamber may be detected by eye, or even electronically detected (not shown in FIG. 2A).

Now that chamber 123 is precisely filled, it may be illuminated by light 117. Light 117 reaching cells in chamber 123 causes complexed cells 261 (those cells labeled with bound optical agent 263) to fluoresce, producing fluorescent light signal 127. Free optical agent 208 is also present in chamber 123 and may also fluoresce (provided the optical agent signal is not induced by binding, which is a known approach which can be used to reduce background signal). Referring back to FIG. 1, signal 127 and light 117 reach transfer optics 131, which is coated with a long-pass interference filter coating 134, removing (or minimizing) light 117 reaching CCD 145, which not blocking (or minimally reducing) signal 127 from reaching CCD 145. The signals are then analyzed by image processor 268 and displayed on display 261, which shows in this example the number of ovarian cancer cells per cc of whole human blood sample 204.

Example 2

Large-Surface-Area Volumetric Chamber

The volumetric chamber can now be discussed in detail. An exemplary chamber is shown in schematic as a sliced-opened horizontal section of the chamber viewed from the top, as FIG. 2A. Other modifications can be envisioned by those of average skill in the art and remain within the spirit of the invention. No limitation of the scope, of this invention is intended by any omission from this design.

One key feature of the volumetric chamber is its large surface area (length by width), which allows for up to milliliter volumes or more. The following table shows how thin the chamber could be if a certain square area chamber is used, and 0.2, 1, or 7.5 cc of blood of volume is required. For most rare CTC tests, levels above 5 cells/chamber should be identified, which suggests that volumes of 1 cc or more may be required. For certain types of early cancer, about 2-4 cells in a 7.5 cc sample have been reported, and therefore 7.5 cc has become the standard volume for the most common commercial cell counting test.

TABLE 1

Minimum Chamber Thickness to Measure 0.2, 1, or 7.5 cc of blood.

| CCD Width | CCD Area | Blood Depth (um) | | |
|---|---|---|---|---|
| (cm) | (sq. cm) | 7.5 cc | 1 cc | 0.2 cc |
| 1 | 1 | 75000 | 10000 | 1000 |
| 2 | 4 | 18750 | 2500 | 250 |
| 3 | 9 | 8333 | 1111 | 111 |
| 5 | 25 | 3000 | 400 | 40 |
| 8 | 64 | 1172 | 156 | 16 |
| 10 | 100 | 750 | 100 | 10 |
| 15 | 225 | 333 | 44 | 4 |
| 25 | 625 | 120 | 16 | 2 |

The region of between 100 to 400 microns in thickness works best in solutions in which no wash step has been performed and the optical agent is fluorescent even when unbound.

A volumetric approach is considered one that is sufficiently large to allow for reliable statistics for rare cell counting. Such statistics following a Poisson distribution, which allows determination of the likelihood of missing a true positive (e.g., CTCs above a certain count threshold). A large surface area is a chamber that has a reasonably large length and width, and possibly a large depth, as opposed to a capillary tube that primarily has length, but minimal width and depth. This results in at least one face of the volume having significant surface area, at least 1 cm$^2$, or more reasonably at least 10 cm$^2$, 20 cm$^2$, or 75 cm$^2$ on one facial surface. In contrast, if two dimensions are small, the surface area tends to be relatively small. For example, a square capillary rod measuring 10 microns by 10 microns in cross section and that is 7.5 cm long has a surface area on the largest face of only 0.0075 cm$^2$. The same rod holds a minimal volume. Similar, a capillary tube holds only 75 microliters for a 1.1 mm diameter capillary tube 7.5 cm in length (e.g., Grafco Flint Glass Microhematocrit Capillary Tubes). Last, commercial hemocytometer slides have similarly small volumes that are typically intended for diluted solutions (e.g., Neubauer Disposable Hemocytometer, Kisker GbR, Germany, which has no large area dimensions and measures only 1 mm×1 mm×0.1 mm for a volume of 0.0001 cc, in contrast to the instant volumetric instrument as defined herein which 0.1 to 1.0 cc or more, Sufficient volumes to allow for counting of rare circulating cells at the required medical level for detection, exclusion counting, or concentration estimates. Such larger blood volumes are typically at least as thick as used for hemocytometers but do not require dilution, and thus are typically opaque rather than transparent as a result of the significant light scattering for light passing through the fluid.

A volume that has reasonable length, width, and possibly depth will have significantly more volume that a capillary tube that primarily has length, but minimal width and depth.

While capillary tubes can be described as volumetric (after all, they are 3-D and have length, width, and depth), a capillary tube typically holds a minimal volume, such as 10 microliters for a 100 micron diameter capillary tube 5 cm in length, and thus are not sufficiently volumetric. Similarly, commercial hemocytometer slides have small volumes that can easily, be transilluminated. In contrast a volumetric, instrument as defined herein holds sufficient volume to allow for counting of rare circulating cells at the required medical level for detection, exclusion, counting, or concentration estimates.

Such volumetric blood samples are typically opaque and translucent rather than clear, as a result of significant light scattering for light passing through the fluid.

A few moments to discuss the statistics of cell counting. The number of events (for example cells that are counted in a volume) given the average number expected, when the events are independent occurrences follows the Poisson distribution. If we assume normal subjects can have up to 10 cells, and that a mean of 10 or higher is abnormal, what is the volume required to determine that the level is in fact above 10 cells/cc. This is dependent on volume studied, as 10 cells per cc equals only 5 cells expected in 0.5 cc, and a fraction of a cell at under 100 microliters. The need for 1 cc is far greater than found in capillary cells. For rare tumor cells with a diagnostic threshold of 16 cells/cc, the same test 4 cells per sample test can be performed with 0.25 cc For the purposes of this application, volumetric means larger volumes nominally greater than 100 microliters, more commonly greater than 0.25 cc, and in the present application and preferred embodiment a volume of about 1 cc or more.

Last, CCDs grow exponentially in cost as their area grows by an exponential factor. For this, a taper or a lens that reduces the area of the imaging detector can have a high value to cost ratio.

The construction of the chamber may now be discussed.

A key feature is the constancy of the volume in the face of stresses. Handling, fluid forces, torque or compression, and the like, can easily alter the volume of the counting chamber. This is not an issue, provided that the chamber returns to a known or calibrated volume when released.

Figure 2B:
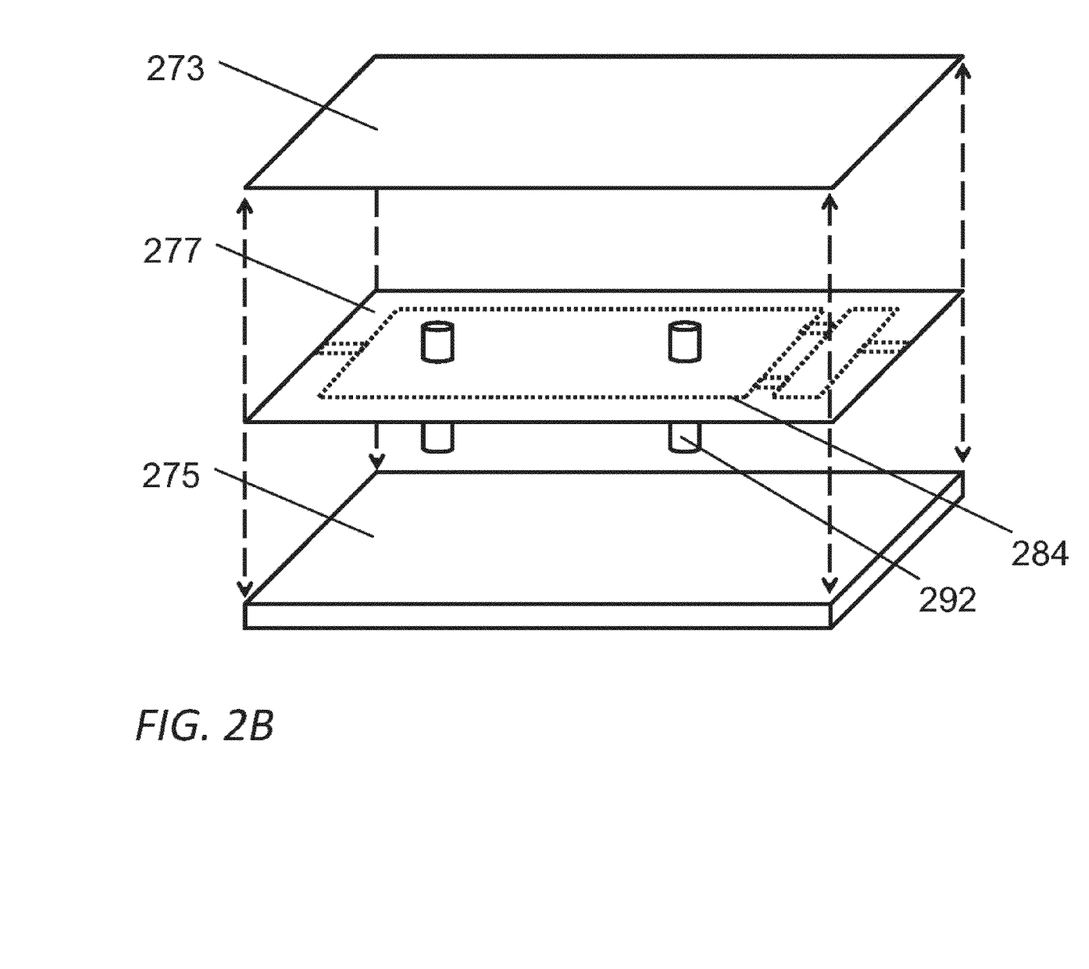
FIG. 2B shows the construction of an imaging chamber.

The design of the chamber shown in FIG. 2A is now shown in exploded form in FIG. 2B, with an emphasis on the construction rather than the features of the chamber. Here, in this embodiment, top window 273 is a rectangular piece of clear glass measuring 1 mm thick. This is placed over bottom window 275, which is a 3.3 mm piece of very clear glass (Borofloat™ glass, Edmund Scientific, Barrington N.J.). This thick glass provides much of the support required to stabilize the chamber, and is flat to within 6 wavelengths of light, producing a remarkably consistent chamber volume.

To separate the top and bottom windows, and provide for a constant spacing, laser-cut membrane 277 is provided. Laser cut line 284 indicates one possible cutting layout, which allows the fluid to track from entry, through the chamber, and to overflow chamber. Membrane 277 has the fluid flow and handling fluid paths cut into it, and in practice has curves rather than corners on the interior surface (shown in earlier FIG. 2A as rounded corner 269). Further, the material of membrane 277 may be hydrophilic to encourage wetting, or coated with other materials to facilitate loading of chamber 123. Membrane 277 may also form a seal, or may simply be a physical shape, to displace fluid within the inner chamber. In order to provide consistent depth where membrane 277 has been removed, optional vertical posts 292 can be added to stabilize the fluid volume. Such posts can be added during assembly, or fabricated as part of the window components using MEMS techniques or other methods and materials known in the art.

Finally, assembled top window 273, membrane 277, and bottom window 275 can be secured using any number of methods known in the art. For example, cyanoacrylate glues can be applied on the edges, as can thermoplastics. It is important that the glues, silicones, or plastics do not creep between windows 273 and 277 and membrane 277, or these materials may expand the chamber volume (by lifting the windows and increasing the gap between the windows) or reduce the chamber volume (by infiltration), either of which may adversely impact chamber performance.

Example 3

A Method of Cell Counting

Figure 3:
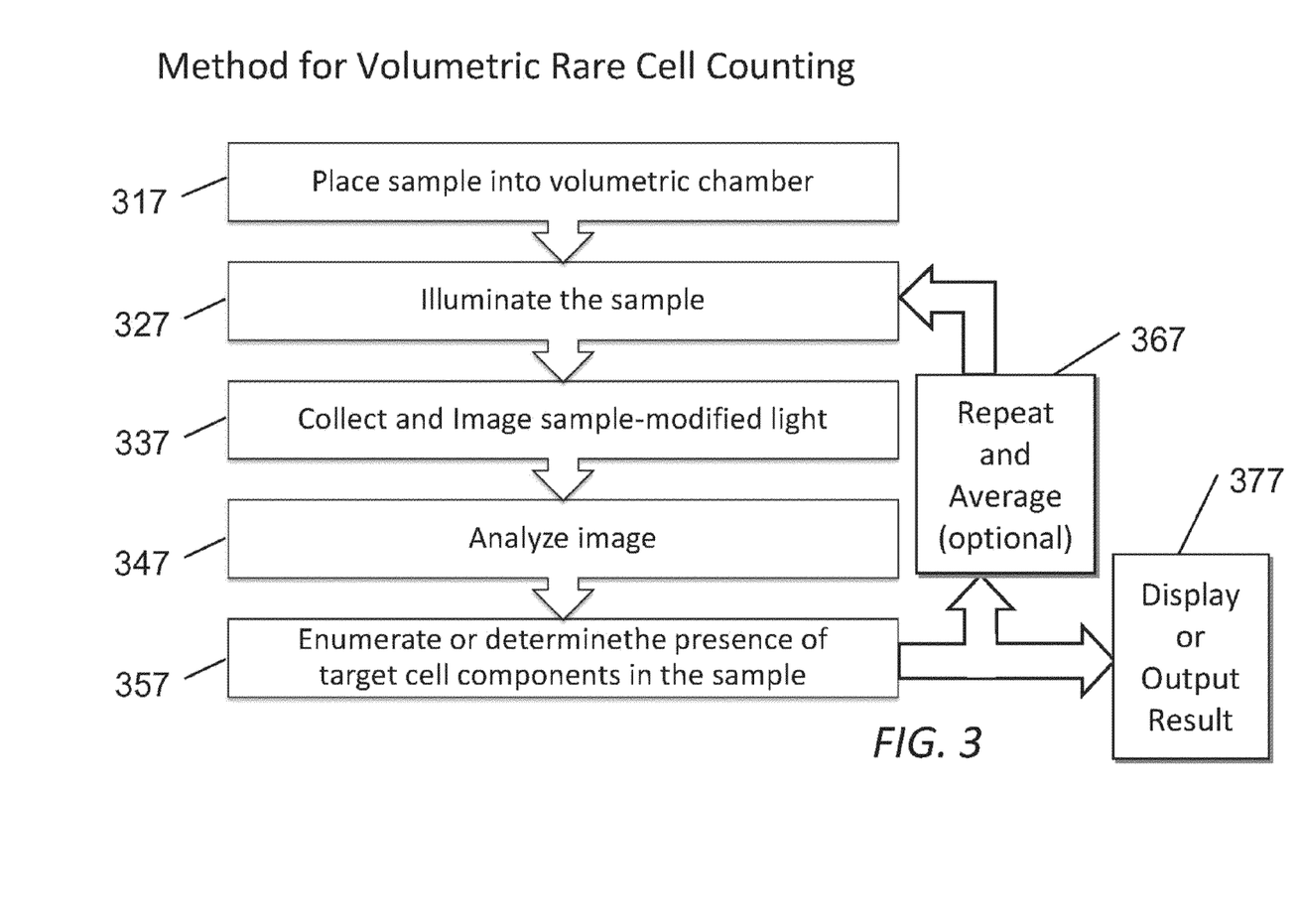
FIG. 3 shows a method practiced in accordance with the instant invention.

Another way to consider this invention is as a method, as shown in FIG. 3.

In this method, first step 317 consists of placing the sample into a volumetric chamber, the chamber having specified dimensions and a first and second broad facial surface, and sample including suspended complexes of both said cells or cell-like moieties and an optically-active cell targeting agent.

Next, step 327 involves illuminating the sample within the chamber on at least one facial surface with light selected to interact, at least in part, with said optically-active agent.

Step 337 involves recording an image of at least said modified light from at least one facial surface.

In step 347, the image is analyzed.

In step 357, the presence, absence, concentration, or count for target cells in the sample is determined, based on the analysis.

In step 367, the sequence of illuminating, imaging, and enumerating may be repeated for additional statistical power, or for analysis of other cellular components.

Finally, in step 377, result is output or displayed.

Example 4

Photon Intensity Maps Based on Device and Method

Based on the above, photon-transport, software was constructed. For this model, known optical features of blood, and labeled cells were used, as obtained from published values. We used mu-a (absorbance coefficient) of 1.8-2.1/mm, mu-s' (reduced scattering coefficient) of 0.28-0.35/mm, a g (mean cosine angle of, scattering) forward-weighted at nearly 1.0 (e.g., 0.96-0.99, see Nilsson 1997). We estimated background noise based on the mean relative partitioning of dye on cells versus an equal volume of fluid, which in this case was 20:1 up to 30:1, and occurring uniformly in all voxels of fluid (note: this is not to be confused with the signal:noise ratio of the resulting image, defined here as the relative heights of the peak and the mean noise in the image)

Figures 4A, 4B, 4C:
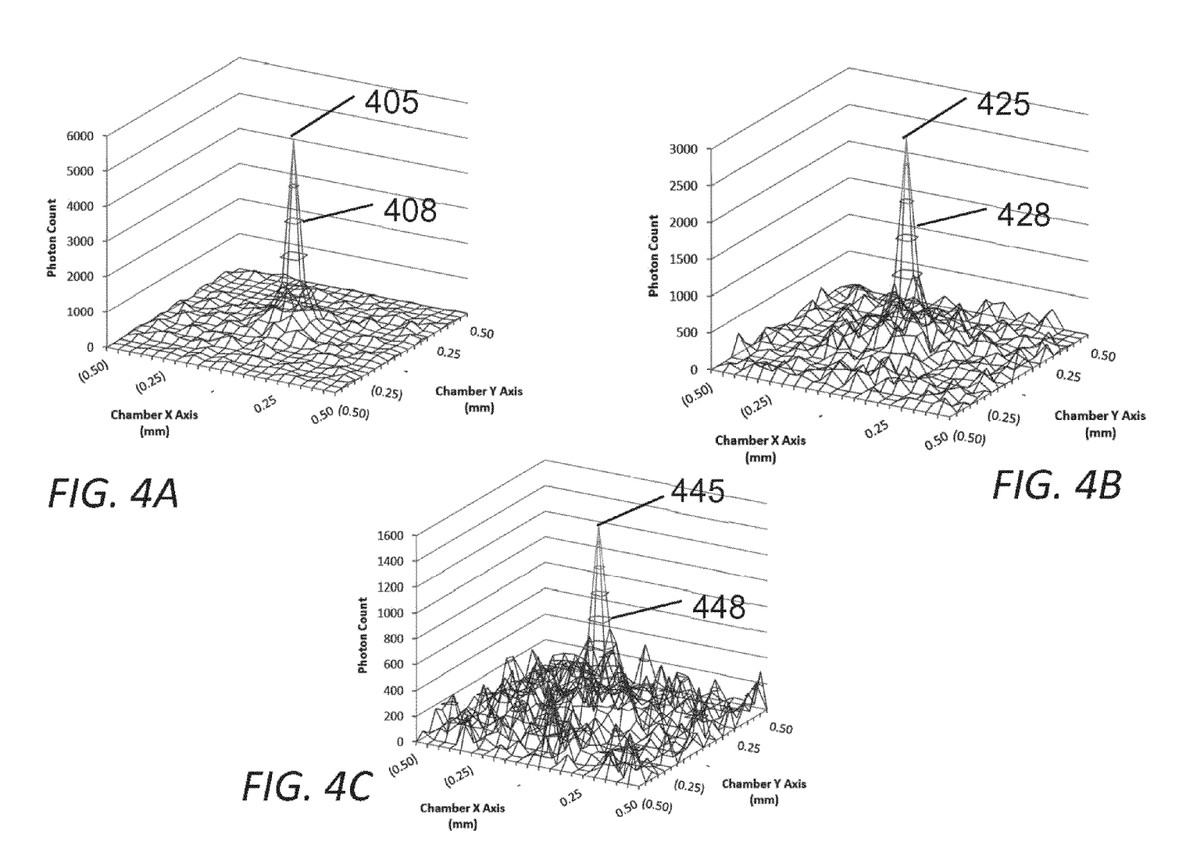
FIG. 4A-C show photon count image intensity over 1 mm×1 mm central portion of the image for one cell placed at three different depths away from the CCD detector.
Figure 5A:
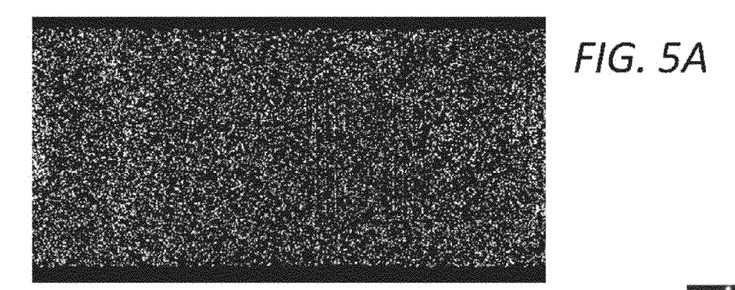
FIG. 5 shows an actual image of 6 micron $MgSO_4$ beads stained with an infrared fluorophore.
Figure 5B:
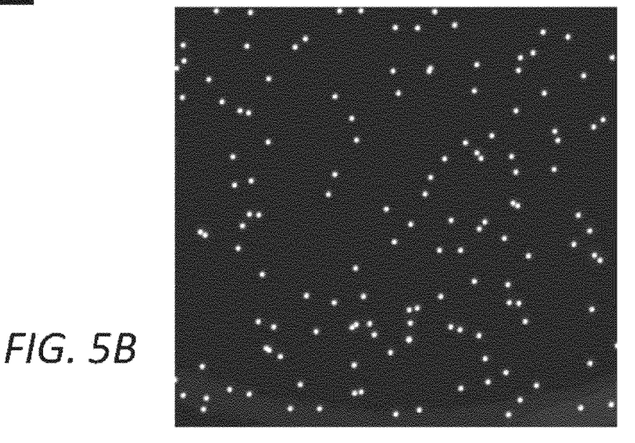

Results from these Monte Carlo experiments are shown in FIGS. 4A, 4B, and 4C. Here, analysis was stopped after 25,000 fluorescent photons were detected (achievable in seconds using a 1-100 mW source over 100 cm² area, including losses for interfaces, collimation, filters, interfaces, and including data obtained from ovarian cancer cells labeled with a folate-dye label), shows what can be expected.

In these figures, only a 1 mm×1 mm field of view is plotted (labeled −0.5 mm to 0.5 mm on the X and Y axes) out of a potential 15 cm×15 cm CCD image. It is assumed that no more than 100 cells will found in this entire chamber, equal to less than an average of 1 cell per 1 cm² imaging area. As the chance of any 1×1 mm X-Y area having a cell is about 1% of even that small chance, and therefore the risk of cell overlap (2 cells in same 1 mm×1 mm window) is very low, even considering the possibility image broadening to 200 um FWHM width due to scattering of the signal on the image, and this rare overlap should will not affect absolute cell counts with any significance.

In FIG. 4A, the image from a labeled cell found near the top of an approximately 100 micron chamber is shown (the top of the chamber being the farthest from the CCD detector, and thus subject to the widest optical scattering of any fluorescent signal). Here cell peak 405 is clearly seen at over 5,000 photos, while the full-width half maximum (FWHM) at half-max height 408 is 64 microns. Note the slightly uneven background due to the staining and fluorescence of the serum solution. Signal to noise is better than 50:1.

In FIG. 4B, the same cell at the imaging side of a 200 micron chamber is shown. Again, cell peak 425 is clearly seen, though not as high, with a peak of just below 3,000 counts and slightly wider FWHM at half-max 428 of 71 microns. Signal to Noise is 11:1.

In FIG. 4C, the same cell at the imaging side of a 333 micron chamber is shown. Cell peak 445 is less strong at about 1,500 photons but is still clearly seen, with an increasingly widened FWHM at half-max height 448 of 90 microns. Signal to Noise falls to about 2:1.

A table was made from the data above in FIGS. 4A-C (and from other image depths for which the calculations are similar but the graphs are not shown), as shown below. Note that at 500 micron chamber depth, the FWHM of the image at half-max is over 100 microns, and approaches double the width of the image in the 100 micron thick chamber:

TABLE 2

Blurring of signal and counts at different cell depths.

| Cell Depth (um) | Peak Count | FWHM (um) | S/N (ratio) |
|---|---|---|---|
| 100 | 5341 | 64 | 51:1 |
| 200 | 2864 | 71 | 11:1 |
| 333 | 1546 | 90 | 2:1 |
| 500 | 562 | 106 | 0.3:1 |

Cells are placed different depths from the detector (cell depth) in chambers of the same total depth in order to study maximum blurring of the signal for each chamber thickness. Good signal to noise is present up to approximately 400 microns of depth, more or less depending upon the dye characteristics and background levels. Note that a widening FWHM may also serve as a discriminant for noise, and a method of determining the apparent depth of the signal source. Also, wavelength shifts (redder mean wavelength with deeper cells, not shown) occur due to the influence of wavelength on scattering, which can also be used as depth signal.

A few issues to consider. First, when the cell is at the bottom or middle of the chamber, the signal to noise may not be much better due to background single from the column of stained fluid above and below it. Therefore, consideration of the cell against the imaging side of the chamber is a good estimate of the visibility of cells in various chambers.

Second, the depth of the signal can be determined or estimated in, part due to spectral shifts, by widening of the FWHM, or both, assuming the cell size is relatively constant in any given sample. By looking at Table 2, it can be seen that the apparent width of the cell on the image (FWHM) is many times greater than the 10 micron tumor cell itself. Because of this disparity, small changes in cell size do not result in an equivalently proportional change in apparent size on the image. Thus, in the example of Table 2, a cell that appears 64 microns wide is at a depth of approximately 100 microns, while a cell that appears 106 microns wide is at a depth of 500 microns. Thus, distribution and spatial density in 3D can be gained from the 2D image. In some instances, such as tissue cultures, such depth-related information can be relevant. Similarly, there is a reported spectral shift with light that scatters through tissue, and this spectral shift can also be used by one of general skill in the art to convert the 2D image to a 3D distribution estimate.

Of course, depth cannot be extended infinitely. For example, it is clear that infinite depths are not likely to work. In Table 2, depths over 500 microns will have poor signal to noise. With additional improvements, depths of 1-2 centimeters may be achievable with various methods known in the art.

Thicker volumes can be addressed by creating a plane that labels cells at a certain depth with a unique signal. For example, modulating an ultrasonic phase array to modulate a plane 500 microns below the surface could allow an AC signal to be added to the optical signal coming from that layer. Scanning the depth of the plane allows for different planes to be labeled and monitored. Methods of phased offsets of sampling and illumination frequencies can then be used to walk through the sample in a way that permits imaging. Similarly, a pulse of light with high regional absorption can create local expansive thermal stress, leading to the formation of acoustic waves, which can be correlated with depth based on the delay for acoustic detection due to the relatively fast travel of light, followed by the slow transit of sound.

Another method can be the dilution of material, which produces a higher regional contrast for the stained cells versus the background, on a per volume basis.

Example 5

Studies Using Magnesium Sulfate Beads

In this example, stained $MgSO_4$ beads measuring 6 microns across and stained with a dye that absorbs at 740 nm and emits at 770 nm (PeakFlow™ brand Reference Beads, Invitrogen, Carlsbad, Calif.). Another method can be the dilution of material, which produces a higher regional contrast for the stained cells versus the background, on a per volume basis.

Example 6

Studies Using Tumor Cells

A note on the staining and labeling of cells. Tumor cells have been labeled and stained in vivo and ex vivo. For example, ovarian cancer cells can be labeled with folate-CyDye that binds to the endocytosing folate type-II receptor. Prostate cancer cells can be stained with anti-PSMA monoclonal antibody. Highly metabolic cancers can be stained with a glucose metabolite, such as fluoro-deoxyglucose, that becomes trapped inside the cell. Circulating nanobots can also bind to specific cell types. Other cells have been reported in the literature as well.

Tumor cell lines were obtained from ATCC (Manassas, Va.). We tested two cell lines. The first, LnCaP is a prostate cancer cell line that expresses the PSMA transmembrane transport protein, which is targeted by an antibody, against the extracellular domain of PSMA. The second cell line, SLOV-3, an ovarian adenocarcinoma line, does not express PSMA. Therefore, when the dye is added to a chamber containing these cells, the dye should not binding in a targeted, specific manner.

A 100 micron chamber thickness was first studied. Because the system can be scaled for area, we began with a 2 cm×1 cm×100 micron chamber, for a volume of 20 microliters. This is intended to show feasibility, as operation at this depth allows a 10×10 cm chip to be built at the same depth with a larger imaging field.

Figure 6A:
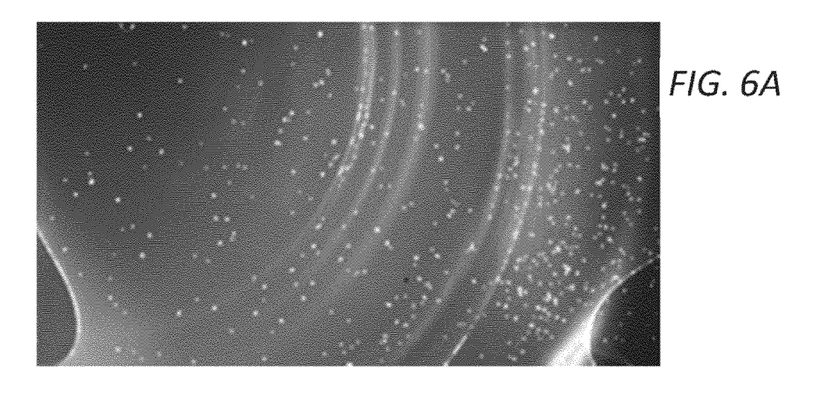
FIG. 6A-B show automated software counting of cells from images of two cell families (A) LnCaP prostate cancer and (B) Ovarian Adenocarcinoma, only the first of which binds the PSMA target label.

FIG. 6A shows a dye filled, cell-free chamber section computer analyzed for areas of statistically increased fluorescence with a radius between 10 and 100 microns and with a roundness (elliptical axis ratios of less than 1.5 to 1, with no cells seen. There is bright fluorescence in the background, but as there are no cells to localize the stain, there are no cells detected.

Figure 6B:
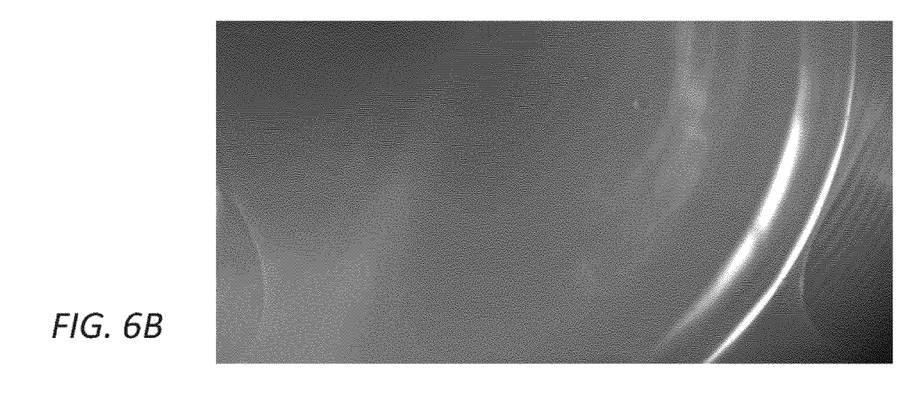

FIG. 6B shows a similar chamber, now filled with LnCaP cells and dye in accordance with the spirit of this invention. In contrast to FIG. 6A, in FIG. 6B the cells are visible at low contrast using the computerized cell counting system. The cell counting shows 904 cells/chamber.

FIG. 6C shows a similar chamber, now filled with SKOV-3 cells and dye, mixed in accordance with the spirit of this invention.

Last, it should be noted that circulating cell counting is not without detractors. Some skilled in the art believe such cell counts are misleading. It will require clinical trials to verify that such systems have clinical relevance. However, even if not, this could be an excellent research tool, providing commercial value even before clinical relevance is proven.

The preceding descriptions of specific embodiments of the present invention have been presented for purposes of illustration and description only. They are not intended to be exhaustive or to limit the invention to the precise forms disclosed. The embodiments were chosen and described in order to explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents.

We have discovered a large-area, large-volume volumetric method of counting circulating cells in a blood or fluid sample, that can be performed without prep, rapidly, and on 1 cc of so of blood. We anticipate that this device and method will have significant clinical and commercial-value as product or service that can be delivered to customers. The method involves the injection of blood into a disposable volumetric chamber for counting. Exemplary systems, devices, and agents for deployment while practicing the business method are also disclosed. These agents have been tested in the lab, or simulated in models. Both the agents and the method have immediate application to critical and pressing clinical and research problems, especially to the early diagnosis of one or more cancers based on early circulating tumor cells, and thus constitute an important advance in the art.

What is claimed is:

1. A device for counting rare discrete moieties in a large surface area sample chamber, the device comprising:
    (a) a sample holder for receiving and containing a non-flowing opaque fluid sample, said holder having walls arranged to create a volumetric chamber with at least one facial surface of a predetermined chamber length and width, and a surface area of at least 1 cm², and with a predetermined chamber depth smaller than the length or width and a chamber volume of a least 0.1 cc, and;
    (b) a light source for producing a beam of illuminating light impinging upon the chamber to illuminate the sample in the chamber in its entirety, said sample including at the time of illumination suspended complexes of rare discrete moieties and an optically-active cell-targeting agent, and said beam having a wavelength selected so as to be disposed to interact at least in part with said optically active agent and to produce a modified light in addition to the illuminating light as a result of said interaction;
- (c) an imaging light detector arranged to detect said modified light, and for providing a detected image; and,
- (d) image analysis hardware, software or both for determining the presence, absence, count, or concentration of said cells or discrete moieties based upon said detected image.

2. The device of claim 1, wherein the optically-active agent contains a fluorophore that is activated at an excitation wavelength in the range of 400 to 2000 nanometers.

3. The device of claim 1, wherein the optically-active agent comprises a quantum dot.

4. The device of claim 1, wherein the optically-active agent comprises an optical dye.

5. The device of claim 1, wherein the cell-targeting agent comprises an antibody.

6. The device of claim 1, wherein the cell-targeting agent comprises a physiologic nutrient, metabolite, or analogue thereof.

7. The device of claim 1, wherein the analysis distinguishes background modified light produced by free optical agent in the solution from modified light produced by optical agent associated with cell complexes.

8. The device of claim 1, wherein the imaging detector is a CCD imaging detector.

9. The device of claim 8, wherein the CCD is cooled.

10. The device of claim 1, wherein the chamber volume is at least 7.5 milliliters.

11. The device of claim 1, wherein the chamber volume is at least than 250 microliters.

12. The device of claim 1, wherein the chamber volume is at least 1 milliliter.

13. The device of claim 1, wherein the chamber facial surface size is at least 10 square centimeters.

14. The device of claim 1, wherein the chamber facial surface size is at least 50 square centimeters.

15. The device of claim 1, wherein the chamber facial surface size is at least 100 square centimeters.

16. The device of claim 1, wherein the inner chamber depth is at least 100 microns.

17. The device of claim 1, wherein the inner chamber depth is at least 200 microns.

18. The device of claim 1, wherein the optically-active agent is targeted towards cancer cells.

19. The device of claim 1, wherein the optically-active agent is targeted toward an infectious disease selected from the list of infectious diseases consisting of gram positive sepsis, gram negative sepsis, and malaria.

* * * * *